Patented June 23, 1931

1,811,268

UNITED STATES PATENT OFFICE

GUSTAF HAGLUND, OF STOCKHOLM, SWEDEN, ASSIGNOR TO PATENT AKTIEBOLAGET GRÖNDAL-RAMEN, OF STOCKHOLM, SWEDEN, A LIMITED COMPANY

METHOD OF PREPARING A LIQUOR FOR THE PRODUCTION OF SULPHITE CELLULOSE

No Drawing. Application filed January 4, 1929, Serial No. 330,414, and in Sweden January 10, 1928.

Under the present methods of producing sulphite cellulose, a high concentration of the dissolved organic matters cannot be obtained in the waste lyes and that fact presents one of the greatest obstacles to the economical utilization of such lyes. The percentage of the dissolved organic matters contained in such lyes may be estimated to be about 100 gr. per liter of the lye, if it is taken directly from the boilers.

My invention relates to a method of increasing the said percentage of organic matters contained in the lye considerably or to about twice the ordinary amount. This is effected by using the waste lye from a previous boiling at the preparation of a boiling liquor for the subsequent one. Such a procedure, however, is utilizable only under certain conditions.

As the sulphite boiling is carried out at present, the boiling liquor consists of a solution of bisulphite of calcium in water, which solution is saturated with a suitable quantity of free sulphurous acid. The calcium compounds in a waste lye from such a boiling process being comparatively unstable and difficult to dissolve, such a lye is not suitable for the preparation of a fresh boiling liquor, due to the fact that at an increased concentration such compounds are very liable to decompose causing precipitation of new compounds, which are difficult to dissolve.

The compounds resulting from boiling with an alkali bisulphite boiling liquor are, on the contrary, more stable and more readily soluble, for which reason they are more suitable for the sulphite boiling in question. From an economical point of view a solution of sodium bisulphite is the most appropriate. Even when using such a solution, certain precautions should, however, be taken in the preparation of fresh boiling liquor with the aid of waste lye from a previous boiling. Such a lye should not, it might be pointed out, be exposed to influences, which might cause changes in the chemical composition of the organic matters, contained in the waste liquor, and a discolouring of said liquor. For this purpose the alkali required for a repeated boiling operation should first be converted into bisulphite before bringing it together with the waste lye. The free sulphurous acid required for the boiling liquor may then be added to the mixed solutions or these solutions may be saturated per se with the sulphurous acid before they are brought together.

The process may be carried out for example in the following manner.

An aqueous solution, containing for instance 100 gr. hydrate of sodium per liter of water, is converted into a solution of sodium bisulphite by the introduction of sulphurous acid. Waste lye from a previous boiling is added to this solution of sodium bisulphite, which is comparatively concentrated, until the dilution corresponds to about 10 gr. of sodium hydrate per liter, converted into bisulphite.

The boiling liquor, so obtained, will then consist of one-tenth by volume of fresh aqueous solution of bisulphite of sodium, and nine-tenths by volume of waste lye from a previous boiling. Thereafter the whole quantity of solution is saturated with the quantity of sulphurous acid required for the boiling, provided that a sufficient quantity of that acid has not already been supplied to each of the two solutions before they were brought together.

By the process described, chemical conversions of the organic matters, dissolved in the waste lye utilized in the preparation of the fresh boiling liquor, will be prevented. In spite of its high percentage of lye, which has been already used, the boiling liquor prepared in this manner, has a light colour and, on account of its increased percentage of organic matters it may be utilized for many purposes.

Having now particularly described the nature of my invention and the manner of its operation, what I claim is:

1. In the production of sulphite cellulose, the method of preparing a liquor having a high concentration of dissolved organic matters by the use of waste liquor from a previous boiling of such cellulose, which comprises, mixing the waste liquor with an alkali bisulphite solution, and adding the necessary quantities of sulphurous acid.

2. A method according to claim 1, characterized by the fact that, first, a comparatively concentrated solution of alkali bisulphite, preferably sodium bisulphite, is produced, that said solution thereupon is diluted with waste lye from a previous boiling operation and that this mixture is charged to the required degree with free sulphurous acid, which in place thereof may be added to the solutions before bringing them together.

GUSTAF HAGLUND.